Figure 1:
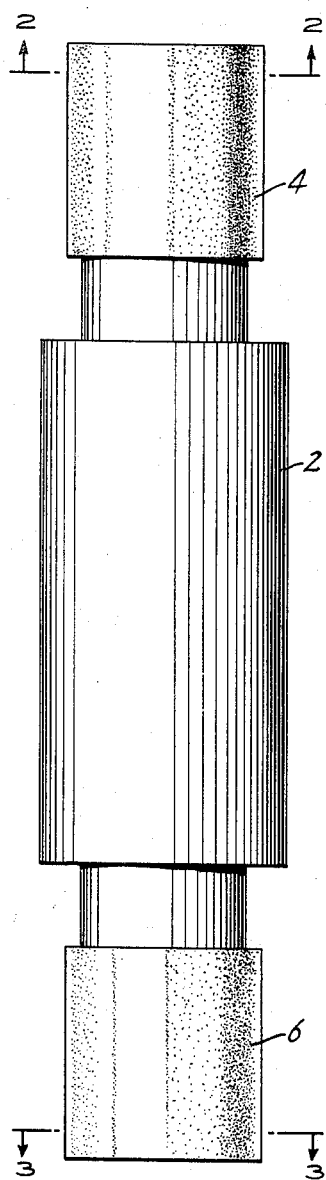

Jan. 12, 1965 J. J. PALOZIE 3,164,908
MEASUREMENT METHODS AND GAUGES
Filed Sept. 18, 1961

*INVENTOR.*
JOSEPH J. PALOZIE
*BY*
Morgan, Finnegan Durham & Pine
ATTORNEYS

United States Patent Office 3,164,908
Patented Jan. 12, 1965

3,164,908
MEASUREMENT METHODS AND GAUGES
Joseph J. Palozie, Broad Brook, Conn., assignor to United Aircraft Corporation, East Hartford, Conn., a corporation of Delaware
Filed Sept. 18, 1961, Ser. No. 138,660
1 Claim. (Cl. 33—168)

The present invention relates to improvements in methods of detecting gauge usage so as to prolong the useful life of the gauge, and to gauges whose usage may be readily detected at a time when the gauge is still intact and of true size.

Although applicable to a wide variety of gauges, this invention is particularly advantageous in prolonging the useful life of the type of gauges known as "go, no-go".

The usual gauge surfaces of the "go, no-go" type are hardened steel finished to proper gauging size and finish. After repeated use, the gauging surfaces wear, thereby resulting in a lack of accuracy of the gauge, which is not readily detectable by the eye. Accordingly, it has been necessary in the past for a skilled mechanic to periodically check such gauges in a manufacturing operation using them. Such checking involves careful, time-consuming tests to determine whether wear of the gauge surfaces is sufficient to require either correction or discarding of the gauge. Checking of the gauges by a skilled mechanic is quite costly and time-consuming, especially in view of the large number and types and sizes of "go, no-go" gauges which may be used even in a simple manufacturing operation.

It has heretofore been proposed to coat or otherwise treat gauge surfaces in such a way that usage could be visually detected. All of the techniques heretofore proposed, however, have the disadvantage that the coating or detection layer forms a part of the measuring surface itself, so that the gauge and the detection layer, whatever its nature, combine to make up the gauge true size. Removal of the detection surface by wear, accordingly, results in a dimensional change in the gauge. In these prior art techniques, when wear of the detection coating is sufficient to be visually observed, the gauge is already out of true size. Accordingly, at this time, the gauge must either be re-worked to true size, or discarded. As will readily be apparent, such techniques, although better than accuracy checking by a skilled mechanic, still have inherent in them important disadvantages.

It is an object of the present invention to provide a method wherein gauge usage may be visually detected at a time when the gauge element itself is intact and of true size.

It is another object of this invention to provide gauge elements whose wear usage may be readily detected prior to the time at which the gauge element itself has been worn by usage.

Other objects of the present invention will in part be obvious and will in part be made clear from the following description.

According to the present invention, gauges are provided with a wear identifying means or detection deposit which makes it possible to detect gauge usage at a time when the gauge surface or element itself has not worn and is still of true size and intact, thereby obviating the necessity of discarding the gauge or reworking it to true size following wear detection, as is necessary when the techniques of the prior art are employed. When wear is detected following the teachings of the present invention, the identifying means or detection deposit is simply renewed and the gauge is then immediately ready for re-use.

The wear identifying means or detection deposits of the present invention comprises an extremely thin layer of erodable metal which is deposited on a gauge surface of true size.

The layer is so thin as not to change the true dimension or true size of the gauge.

The thickness of the wear identifying means or detection deposit disclosed herein is such that it is within the margin of error of the gauge, so that no detrimental dimensional change is made in the gauge element by the wear identifying means. In general, the identifying coating disclosed herein will vary the dimensional size of the gauge by no more than about 0.000005 to about 0.00001 inch.

Upon use of the gauge, the detection deposit or wear identifying means, and not the gauge element itself, is subjected to wear. When portions of the surface of the gauge element itself are exposed by wearing away of the detection deposit, this can be visually observed, and at this point, the detection deposit can be renewed. In other words, so long as the detection deposit is intact, the operator knows that the gauge is satisfactory. When portions of the surface of the gauge element are exposed, this is the signal to the operator that further usage will result in wearing of the surface of the gauge element itself. Accordingly, at this time, the detection deposit coating is renewed. The invention, accordingly, enables production personnel to determine at a glance whether or not a gauge is adequate for use. Further, and more importantly, when the gauges are noted to be unsatisfactory for use, as indicated by exposed surfaces of the gauge element showing through the detection deposit, the gauge elements themselves will be intact and still of true size. Accordingly, the gauges will theoretically last indefinitely as no wearing of the gauge element itself should result if the gauges are properly used.

In addition to detecting gauge usage, the present invention also reveals by visually apparent wear areas of the coating, any gauge abuse due to improper use or handling, such as use on contaminated or gritty surfaces, or unnecessary sliding or twisting movements.

The detection deposit is preferably an erodable metal distinguishable in color from the gauge surface itself, and possessing good wear resistance. Suitable metals include copper, nickel, palladium, platinum, silver, gold, zinc, cadmium, cobalt, and so forth, including mixtures of the foregoing. Copper, because of its color and wear resistance, is preferred for use.

The extremely thin detection deposits may be laid down on the gauge surface by electroless deposition, vapor plating, or other equivalent methods of achieving an extremely thin metal coating which will readily suggest themselves to one skilled in the art from the following description.

In electroless deposition, the gauge element of true size is simply immersed in an ionized solution of a compound of the metal to be electrolessly plated.

Suitable electroless plating solutions include acid baths containing organic and inorganic acid salts of those metals identified above whose position in the electromotive series is such that they will plate out on the particular gauge surface being treated. Salts of such metals include halides, sulfates, phosphates, nitrates, formates, acetates, and so forth. The electroless plating solutions may be prepared by simply dissolving the salts in an acid solution as will be made clear from the examples. Preferably, salts having a high degree of ionization, and which are highly soluble in the aqueous acid bath are employed.

If desired, the surface of the gauge being subjected to electroless deposition may be suitably sensitized to assure a good adherent deposit of the electrolessly plated metal in a manner well understood in the art. In sensitizing the surface, care should be employed to insure that the sensitizing baths or treatments do not affect the gauge surfaces themselves. The term sensitizing, as used herein, includes laying down a thin deposit of one metal adherent to the gauge surface, which is receptive to receiving an electroless deposit of a second metal, which second metal will not itself electrolessly deposit on the gauge surface.

The thickness of the electrolessly deposited coating may be controlled by the concentration of the bath, temperature, and by the time of immersion of the gauge surfaces in the baths. For each coating, the optimum conditions may readily be determined empirically. These conditions should, however, be selected to insure that the time in the depositing bath is short enough to avoid attack of the gauging element itself by the bath.

Due to the ion exchange principle involved in the electroless plating process with acid base, the plating action will stop and add no more thickness once the base metal is fully coated with the plating metal, as no base metal is exposed and available for ion exchange.

If desired, electroplating rather than electroless deposition may be employed simply by connecting the gauge surface to be treated as a cathode in a direct current circuit with a suitable anode, such as graphite, and applying an electromotive force of about 3 to 20 volts. The solutions for electroplating are in general similar to the electroless deposit baths described above.

When vapor plating is used, an adherent metal deposit of the thickness described herein may be formed on the gauge surface by volatilizing a suitable metallo-organic compound in vacuo and decomposing the vapor of that compound on a heated surface of the gauge. Under these conditions, a continuous deposit of metal on the gauge surface is obtained, and the film deposit shows good adherence. Suitable metallo-organic compounds for use in vapor plating include the complexes and salts formed by such metals as copper, nickel and platinum with various organic compounds, and more particularly carbonyl compounds. Such complexes and salts of carbonyl compounds have the ability to decompose at high temperatures to liberate the free metal. Heating of such compounds, for example, results in the decomposition of the compound, with precipitation of the metal constituent thereof.

Among the metallo-organic compounds that may be mentioned are the formates, acetates, and acetylacetonates of copper, nickel and platinum.

In carrying out the vapor coating operation, the gauge element may be brought into contact with a layer of dry, powdered metallo-organic compound, and the surface of the gauge heated to a temperature above decomposition temperature of the metallo-organic compound, to thereby cause decomposition of the compound and deposition of the metal constituent thereof onto the gauge surface. Alternatively, the powdered metallo-organic compound may be applied to the surface of the gauge to be coated in the form of a slurry and dried before the surface is heated to the decomposition temperature of the compound.

Still another possibility is to vaporize the metallo-organic compound, and contact the heated gauge surface with the vapors. Preferably, in this procedure, the vapors of the metallo-organic compound are maintained at a temperature below their decomposition temperature and the surface of the gauge to be coated is heated above the decomposition temperature of the vapors. When the hot surface above the decomposition temperature of the vapors contacts the vapors, the vapors decompose upon striking the hot surface and the metal deposits at the surface forming a thin adherent continuous film.

The thickness of the vapor deposited coating may be controlled by the temperature of the surface to be coated, time of contact, and so forth, in a well known manner.

Suitable methods for forming the metallic detection deposits disclosed herein will be clear from the following examples, which, although illustrative, are not intended to limit the scope of the present invention, except as such limitations may appear in the claims.

EXAMPLE 1

An acid copper bath of the following composition is prepared:

| Ingredient: | Ounces/gal. |
|---|---|
| $CuSO_4 \cdot 5H_2O$ | 4 to 8, preferably 5 to 7. |
| $H_2SO_4$ (33% aqueous solution) | 0.5 to 5, preferably 2 to 4. |
| Water | Remainder. |

A cleaned cylinder insert type of gauge made of stainless steel was immersed in the bath for five seconds, removed from the bath and thoroughly washed in a second neutralizing bath containing 5 weight percent sodium hydroxide.

Following neutralization, it was discovered that the gauge surface was coated with an even film of copper. Measurements of the thickness of the copper layer indicated that the copper layer had increased the overall diameter of the gauge by 0.000005 inch.

EXAMPLE 2

A cylindrical gauge of the "go, no-go" type is heated to a temperature of 350–450° C. in a chamber provided with means for maintaining it under high vacuum. Copper formate is placed in the same chamber and is heated to bring about its volatilization, which takes place at a temperature in the range 170–180° C. The vapors of the copper formate come in contact with the hot surface of the gauge and decompose. Upon decomposition, the copper deposits at the hot surface forming an adherent detection deposit.

In imposing the detection deposit coating of metal on the gauge surface, it will be appreciated that care should be employed to ensure that the gauge surface itself remains unaffected by the treatment.

Regardless of the method of imposing the detection deposit on the gauge element, care should be used to ensure that the surface of the gauge element is free from foreign materials, such as grease, oil, dirt, and so forth. In cleaning the gauge surfaces in preparation for coating, care should be used to ensure that the surfaces of the gauge element are not affected by the cleaning solutions. In general, it may be said that all other factors being equal, the cleaner the surface to be treated, the more adherent and the better the detection deposit that will be obtained.

Although, as has been indicated above, many different techniques can be employed to provide the gauge surface with the detection film of metal, best results are achieved by electroless deposition, and this method is preferred.

Figure 2:
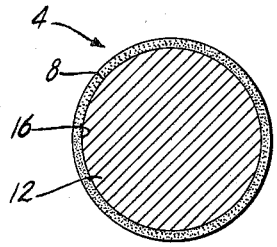
Figure 3:
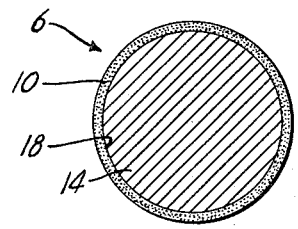

The accompanying drawing shows a gauge of the present invention wherein:

FIG. 1 is a front elevation of the gauge having applied to its gauging surfaces, the detection deposit disclosed herein;

FIGS. 2 and 3, respectively, are face views in the direction of the arrows in FIG. 1.

In the drawing, the same numerals represent similar parts

As shown in the drawing, 2 represents generally a "go, no-go" gauge which has a cylindrical "go" measuring element 4 at one end and a cylindrical "no-go" measuring element 6, at the opposite end.

As will be apparent from FIGS. 2 and 3, the gauge elements 4 and 6, respectively, comprise metallic cylinders 12 and 14, respectively, which have outer surfaces 16 and 18, respectively, of standard true sizes. Superimposed on the surfaces of true size are the extremely thin detection deposits 8 and 10, respectively, disclosed herein.

The metal from which the gauges are made will, of course, depend upon the job to be measured. Usually ferrous metals, including most steels, will be used; the processes of preparing the detection layers disclosed herein, although applicable with a wide variety of gauge metals, are particularly suitable for gauges made up of ferrous metals.

When the gauge is used, the detection deposits 8 and 10 gradually erode, thereby disclosing areas of the underlying steel surfaces 16 and 18 of contrasting color appearance.

When the indication coating wears off to such a degree that it is apparent that further use will result in wear of the gauge surfaces 16 and 18, themselves, the indication deposit may be renewed. It will immediately be apparent that the true size of the gauging elements 12 and 14 themselves will remain intact during use, and that the outer surfaces 16 and 18 of the gauge elements will retain their true size on usage, only the indication deposit coating being subject to the wear. Accordingly, there is no necessity to rework the gauge elements 12 and 14 to true size upon observation that the indication deposit surface should be renewed.

It can therefore be seen that the gauge of the present invention has virtually infinite life, inasmuch as when the indication or detection deposit has worn to expose the surface of the gauge element itself, the deposit is simply renewed. Accordingly, there is never any wear of the actual gauge element itself.

For greater speed, if desired, checking for wear of the detection deposit may be done electronically, as by means of photoelectric cells.

To test the gauges made according to the teachings contained herein, a program was set up to evaluate wear life. Cylindrical, hardened steel, plug-type gauges of the "go, no-go" type shown in the drawings were finished to proper size and then provided with a detection deposit coating, using the procedure of Example 1. A test was set up to insert the resulting gauges into holes varying from 0.00026 to 0.0049 inch larger than actual gauge size prior to imposing the detection deposit. The detection deposit coating, produced following the procedure of Example 1, was copper, and increased the size of the gauge, as indicated in Table I. The holes were made in a steel plate, with a hardness of Rockwell "B"–89, holding the micro finish of the holes to approximately 60 micro finish. Insertion of the gauge cylinders was in a horizontal manner, with no lubrication. The gauges were fully withdrawn each time, and testing was continued until portions of the surface of the gauge metal showed through the copper detection deposit. Table I indicates the results obtained in this test.

Table I

| Original Cylinder Gauge Diameter | Size with Detection Deposit Coating | Hole Size | Original Diametrical Clearance | No. Insertions | Final Cylinder Gauge Diameter |
| --- | --- | --- | --- | --- | --- |
| .50000 | .50002 | .5009 | .0009 | 3,000 | .49999 |
| .50000 | .50002 | .5049 | .0049 | 2,000 | .49999 |
| .37503 | .37503 | .3753 | .0003 | 2,000 | .37503 |
| .37503 | .37503 | .3795 | .00447 | 800 | .37503 |
| .22501 | .22502 | .2255 | .00049 | 300 | .22501 |
| .22501 | .22502 | .229 | .00399 | 400 | .22501 |
| .17498 | .17498 | .1755 | .00052 | 400 | .17498 |
| .17498 | .17498 | .1793 | .00432 | 700 | .17496 |
| .07804 | .0784 | .0783 | .00026 | 200 | .07803 |
| .07804 | .07804 | .0826 | .00456 | 400 | .07803 |

As is readily apparent from Table I, the gauges of the present invention can be used repeatedly without significantly affecting the true size of the gauge.

The apparent changes in gauge size shown in Table I are in millionth increments. Changes of such small magnitude are not generally detectable with normal gauge checking equipment, inasmuch as temperature stabilization and special measuring equipment are needed to measure in increments in this size range.

The invention in its broader aspects is not limited to the specific methods and articles described, but departures may be made therefrom within the scope of the accompanying claim, without departing from the principles of the invention and without sacrificing its chief advantages.

What is claimed is:

A measure device which is comprised of a gauge element of known, true size having superimposed on its gauging surface and firmly adhered thereto a copper detection deposit which is readily discernible visually from the gauge element and not changing the true size of the gauge element beyond the normal gauge class tolerance, the detection deposit having a thickness of between about 0.000005 and 0.00001 inch and capable of being eroded to expose portions of the surface of the gauge element without affecting the true size of the gauge element, to thereby visually indicate gauge wear directly without effecting a change in true size of the gauge element.

References Cited by the Examiner
UNITED STATES PATENTS 2,355,007 8/44 Mitchell _____ 33—168
2,387,970 10/45 Alexander _____ 117—107
3,033,703 5/62 Schneble et al. _____ 117—47

FOREIGN PATENTS 596,103 12/47 Great Britain.

ISAAC LISANN, *Primary Examiner.*